United States Patent [19]
Knape

[11] Patent Number: 5,271,291
[45] Date of Patent: Dec. 21, 1993

[54] SHIFT MECHANISM OF A MOTOR VEHICLE TRANSMISSION

[75] Inventor: Dieter Knape, Heilbronn, Fed. Rep. of Germany

[73] Assignee: Dr. Ing. h.c. F. Porsche AG, Fed. Rep. of Germany

[21] Appl. No.: 930,623

[22] Filed: Aug. 17, 1992

[30] Foreign Application Priority Data

Aug. 16, 1991 [DE] Fed. Rep. of Germany ....... 4127098

[51] Int. Cl.⁵ .................................... G05G 11/00
[52] U.S. Cl. ............................ 74/477; 74/473 R
[58] Field of Search ....................... 74/473 R, 477

[56] References Cited

U.S. PATENT DOCUMENTS

| | | | |
|---|---|---|---|
| 3,264,893 | 8/1966 | Stott et al. | 74/477 |
| 4,307,624 | 12/1981 | Mylenek | 74/477 |
| 4,543,845 | 10/1985 | Sabel | 74/477 |
| 4,727,765 | 3/1988 | Schneider | 74/477 |
| 4,793,202 | 12/1988 | Okubo | 74/477 |

FOREIGN PATENT DOCUMENTS

| | | |
|---|---|---|
| 0131720 | 1/1985 | European Pat. Off. . |
| WO86/00967 | 2/1986 | European Pat. Off. . |
| 0395241 | 10/1990 | European Pat. Off. . |
| 1731865 | 7/1956 | Fed. Rep. of Germany . |
| 2317725 | 10/1973 | Fed. Rep. of Germany . |
| 3314411 | 10/1984 | Fed. Rep. of Germany . |
| 2571667 | 4/1986 | France . |
| 2-180381 | 7/1990 | Japan . |

Primary Examiner—Rodney H. Bonck
Assistant Examiner—David W. Laub
Attorney, Agent, or Firm—Evenson, McKeown, Edwards & Lenahan

[57] ABSTRACT

A shift mechanism for a motor vehicle transmission, three transmission gears can be preselected by rotating on a shifting shaft. By the longitudinal displacement of the shifting shaft, the transmission gears can be shifted by shifting forks. For the locking of those transmission gears that are not to be shifted, a locking shaft is disposed in parallel with respect to the shifting shaft and can be rotated thereby. The locking parts fastened to the locking shaft prevent a longitudinal movement of those shifting forks which are assigned to the unshifted transmission gears.

8 Claims, 7 Drawing Sheets

SHIFT MECHANISM OF A MOTOR VEHICLE TRANSMISSION

BACKGROUND AND SUMMARY OF THE INVENTION

The present invention relates to a shift mechanism of a motor vehicle transmission, and more particularly, to a shift mechanism having a shifting shaft which can be rotated to successively preselect the transmission gears and which can be longitudinally displaced to shift the transmission gears.

German Patent Document DE-OS 33 14 411 discloses a shift mechanism in which the transmission gears can be preselected by the longitudinal displacement of a reversing lever actuated by the shifting shaft, and can be shifted by rotation of the reversing lever. For the shifting of the transmission gears, the reversing lever displaces the shift rods on which respective shift forks are fastened which engage in synchronizer clutches of the transmission gears. For a five-speed transmission with a reverse gear, at least three shift rods are required which are longitudinally displaceably disposed in the transmission case.

It is an object of the present invention to lower the manufacturing costs of a shift mechanism and to reduce the friction during the preselecting and shifting of the transmission gears. This object has been achieved in accordance with the present invention by disposing a locking shaft in parallel to the shifting shaft so as to be lockable in the longitudinal direction, whereby the transmission gears that transmission gears that are not to be shifted are locked by the locking shaft.

If the transmission gears can be preselected and shifted directly by the rotation and longitudinal displacement of a shifting shaft, shift rods are thus not required. The saving of the shift rods, in addition to a lowering of the manufacturing costs, also leads to a reduction of the friction when the gear is operated. For the locking of the transmission gears that are not to be shifted, a locking shaft is used which is in parallel with the shift shaft and which is rotated along with the shift shaft during the preselection of the gears. The friction which occurs during the rotating movement is much lower than the sliding friction during the longitudinal displacement of shift rods.

BRIEF DESCRIPTION OF THE DRAWINGS

These and other objects, features and advantages of the present invention will become more apparent from the following detailed description of a currently preferred embodiment when taken in conjunction with the accompanying drawings wherein.

DETAILED DESCRIPTION OF THE DRAWINGS

Figure 1:
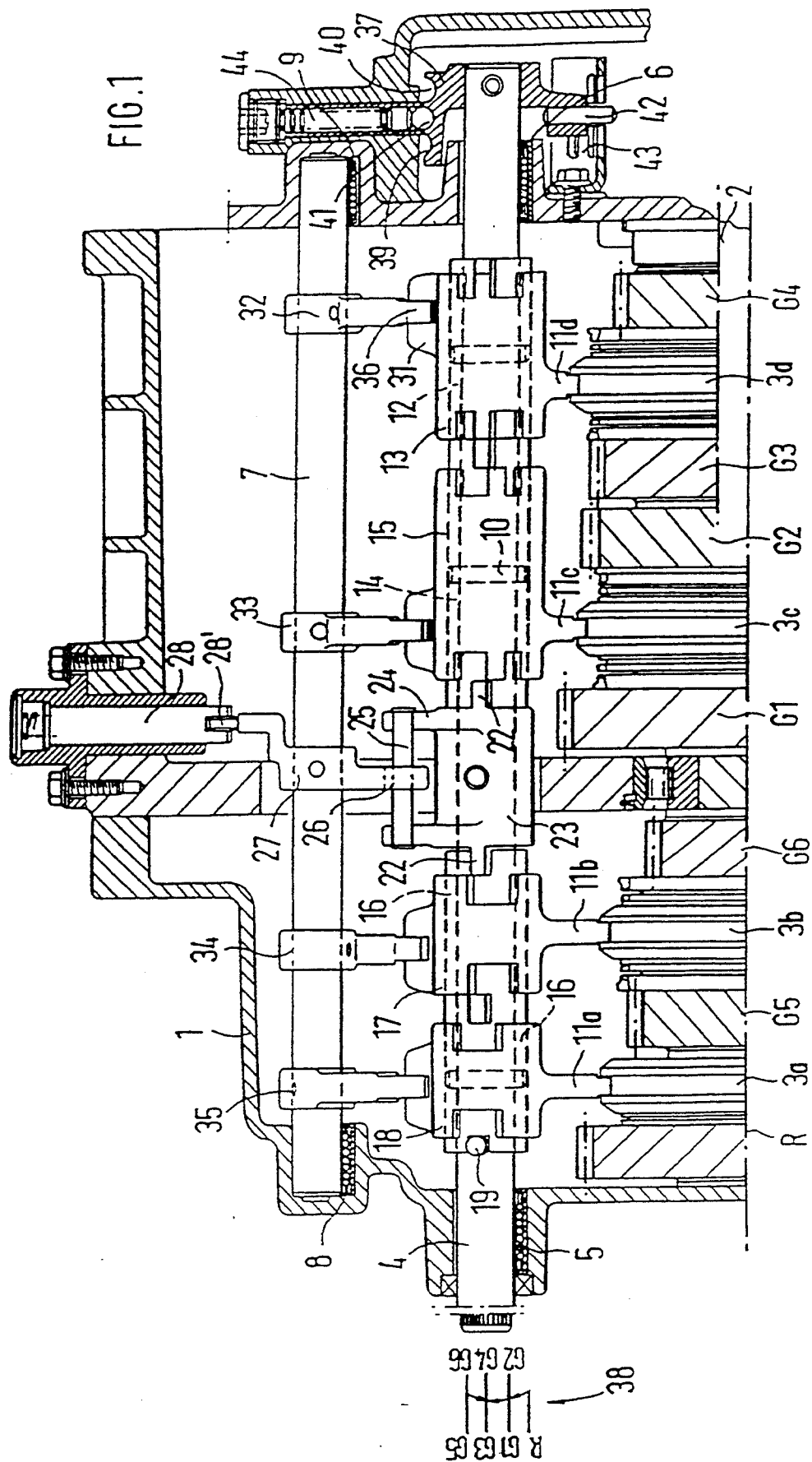
FIG. 1 is a longitudinal sectional view of a shift mechanism in accordance with the present invention for a six-speed transmission.

In a transmission case the loose wheels of the fourth gear G4, of the third gear G3, of the second gear G2, of the first gear G1, of the sixth gear G6, of the fifth gear G5 as well as of the reverse gear R are disposed on a shaft 2 in the aforementioned sequence. By way of multiple synchronizer clutches 3a–d, the loose wheels can each be connected with the shaft 2 to transmit torque. A shifting shaft 4 is disposed in parallel to the shaft 2 in the transmission case in needle bearings 5, 6 in a longitudinally movable and rotatable manner. In parallel to the shifting shaft 4, a locking shaft 7 is rotatably disposed in needle bearings 8 and 9 of the transmission case 1. In the axial direction, the locking shaft 7 is locked on both sides on the transmission case while leaving a slight air gap of approximately 1 mm.

The transmission gears are preselected by rotation of the shifting shaft 4 and are shifted by its longitudinal displacement. For this purpose, several shifting sleeves are fastened on the shifting shaft 4 by pins 10. They interact with fork sleeves which are rotatably disposed thereon and which are provided with shift forks 11a–d for actuation of the synchronizer clutches 3a–d. For the selection and shifting of gears G3, G4, a shifting sleeve 12 (shown in dotted lines) and a fork sleeve 13 are assigned thereto. For the preselection and shifting of gears G1, G2, a shifting sleeve 14 and a fork sleeve 15 are assigned thereto them. For the preselection and shifting of gears G5, G6, shifting sleeve 16 and a fork sleeve 17 are assigned thereto. For the actuation of the R-gear (reverse), the shifting sleeve 16, a fork sleeve 18 and a pin 19 fastened in the shifting shaft 4 are assigned thereto. The pin 19 is used only for disengagement of the R-gear.

Radially projecting claws 20 are mounted on the shifting sleeves as seen in FIGS. 2-5. For shifting of a transmission gear, the claws 20 rest against the face of the fork sleeve assigned to the particular transmission gear. By way of the longitudinal displacement of the shifting shaft 4, this selected transmission gear can be shifted. In this situation, the remaining claws 20 dip in a no-contact manner into ring recesses 21 of the other fork sleeves so that these fork sleeves remain stationary.

In order to be able to shift the third gear G3, the shifting shaft 4 is first rotated into such a preselecting position that the claw 20 of the shifting sleeve 12 rests against the right face of the fork sleeve 13. By displacement of the shifting shaft 4 toward the left as viewed in FIG. 1, G3 is shifted. In the same preselection position, by way of the claw of the adjacent shifting sleeve 14 resting against the left face of the fork sleeve 13, the fourth gear G4 can be shifted toward the right by displacement of the shifting shaft 4. The other gears may also be shifted in a similar manner. Gears G2 and G5 are shifted by axially projecting claws 22 of a driving bush 23 pinned onto the shifting shaft 4.

Figure 7:
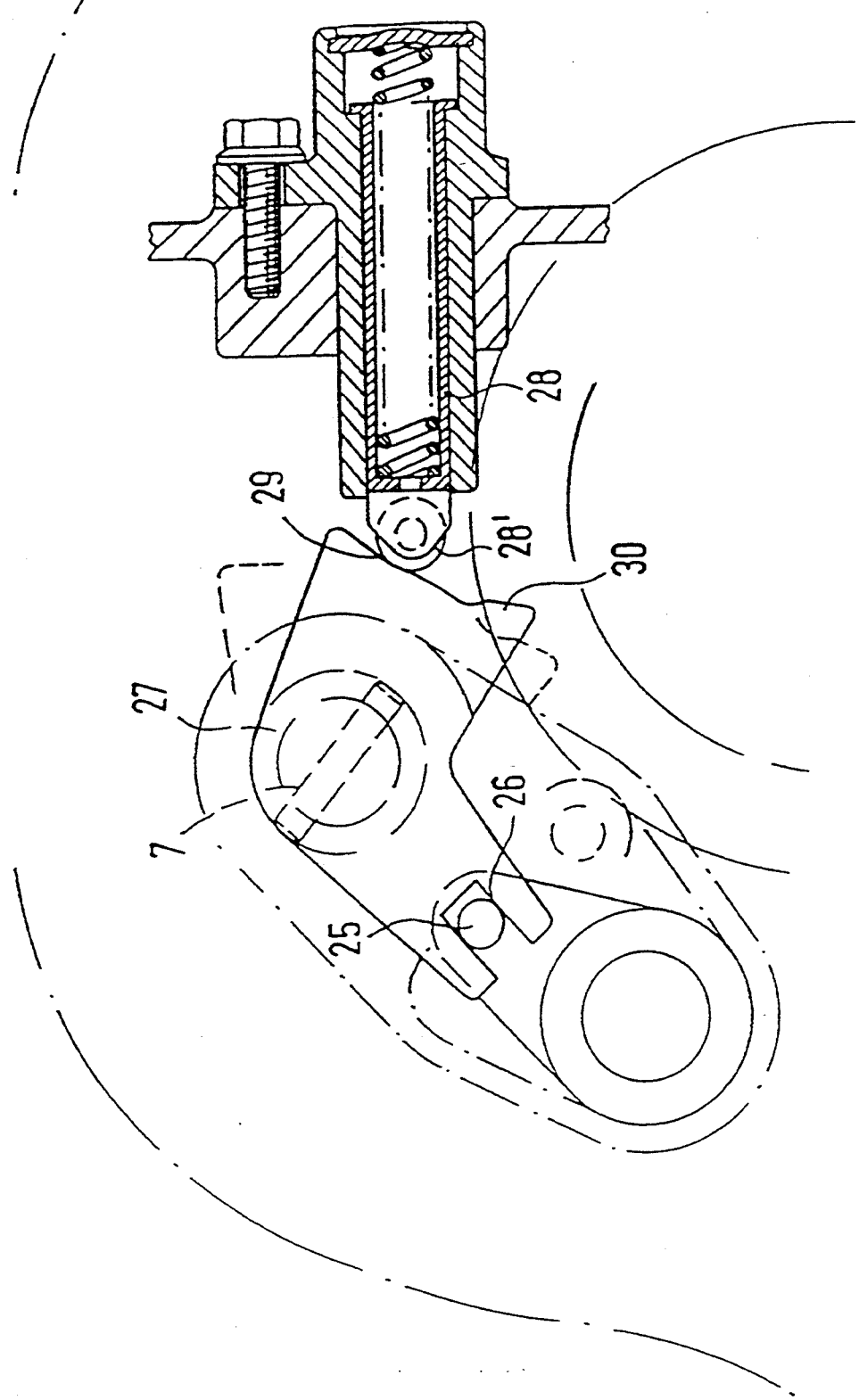
FIG. 7 is a cross-sectional view of a preselection lock on a locking shaft.

The driving bush 23 also has the purpose of transmitting the rotating movement of the shifting shaft 4 to the locking shaft 7. In brackets 24 of the driving bush 23, a driving pin 25 is fastened in parallel to the shifting shaft 4. It engages in a connecting link guide 26 of an angular bracket 27 pinned against movement to the locking shaft 7. On its one leg, the angular bracket 27 has the connecting link guide 26, and on its other leg, the bracket 27 has a ramp profile interacting with a spring bolt 28 and a roller 28' as seen clearly in FIG. 7. The preselection lock illustrated in FIG. 7 makes the preselection of transmission gears noticeably more difficult. When gears G5, G6 are preselected, the spring bolt 28 loaded by a spring slides along a slightly rising ramp 29. In the other extreme rotating position of the angular bracket 27, the R-gear can be reached via a steeply rising ramp 30.

In order to prevent actuation of the other shifting forks when a shifting fork is actuated, a locking arrangement is provided, as illustrated in FIGS. 2 to 5 in various positions. Radially projecting noses 31 are mounted in all fork sleeves 13-18 and interact with locking parts which are pinned to the locking shaft 7. A locking part 32 is assigned to the fork sleeve 13 of gears G3/G4; a locking part 33 is assigned to the fork sleeve 15 for G1/G2; a locking part 34 is assigned to the fork sleeve 17 for G5/G6; and a locking part 35 is assigned to the fork sleeve 18 of the R-gear.

Figure 2:
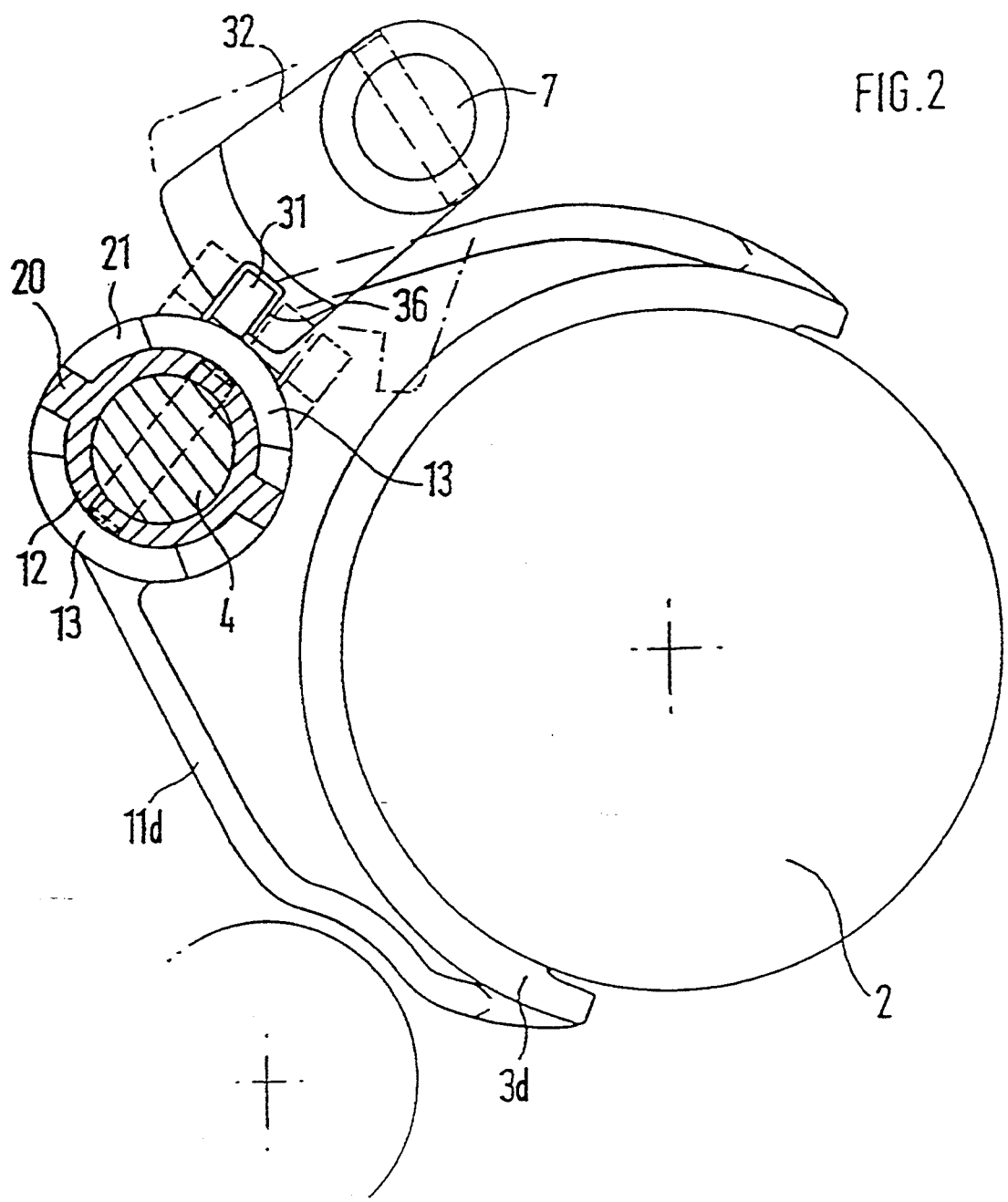
FIG. 2 is a partial cross-sectional view transverse to the plane of FIG. 1 of the locking position of the transmission of FIG. 1 when gears G3/G4 are preselected.
Figure 3:
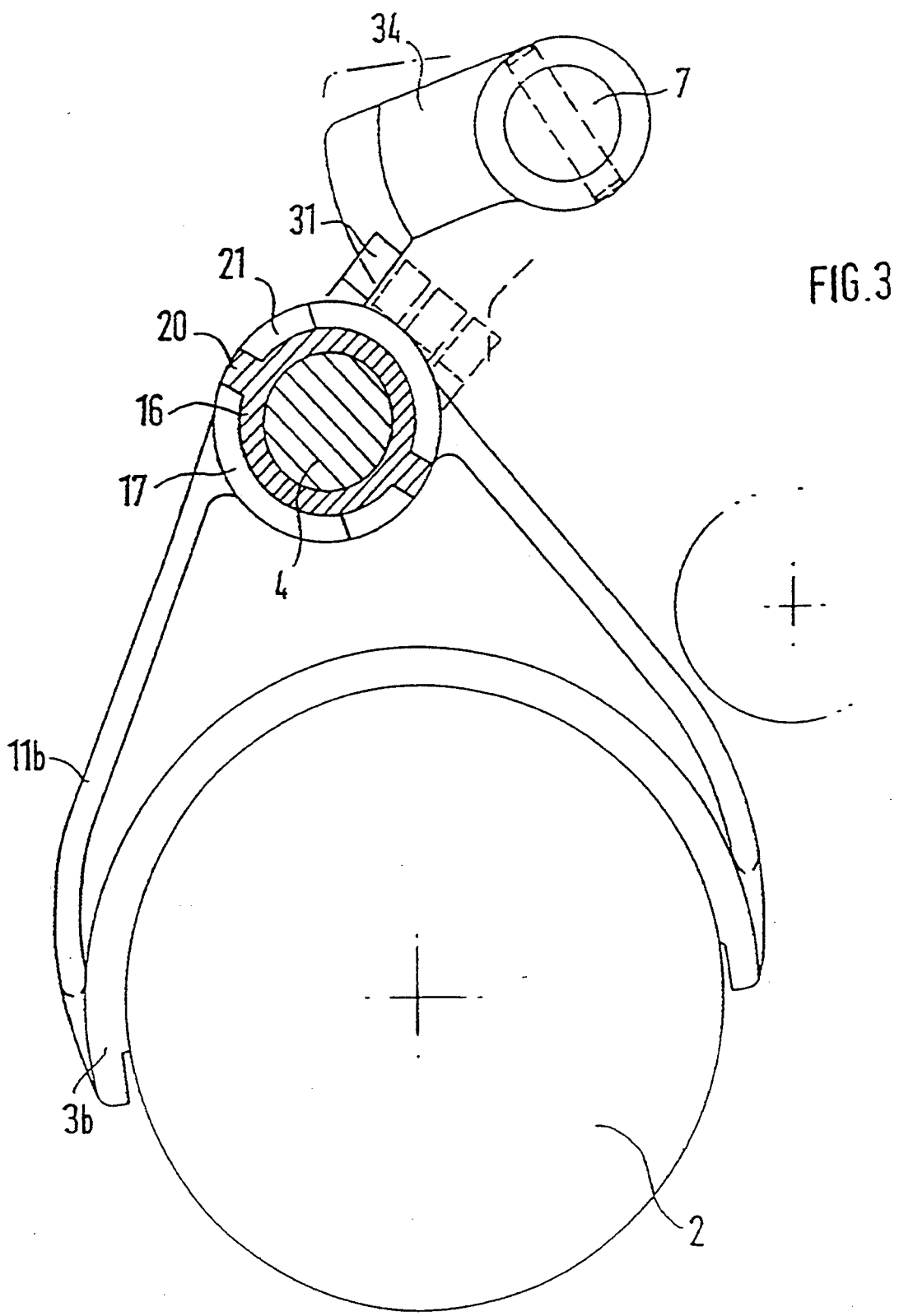
FIG. 3 is a partial cross-sectional view of the locking position of the transmission of FIG. 1 when gears G3/G4 ar preselected for G5/G6.
Figure 4:
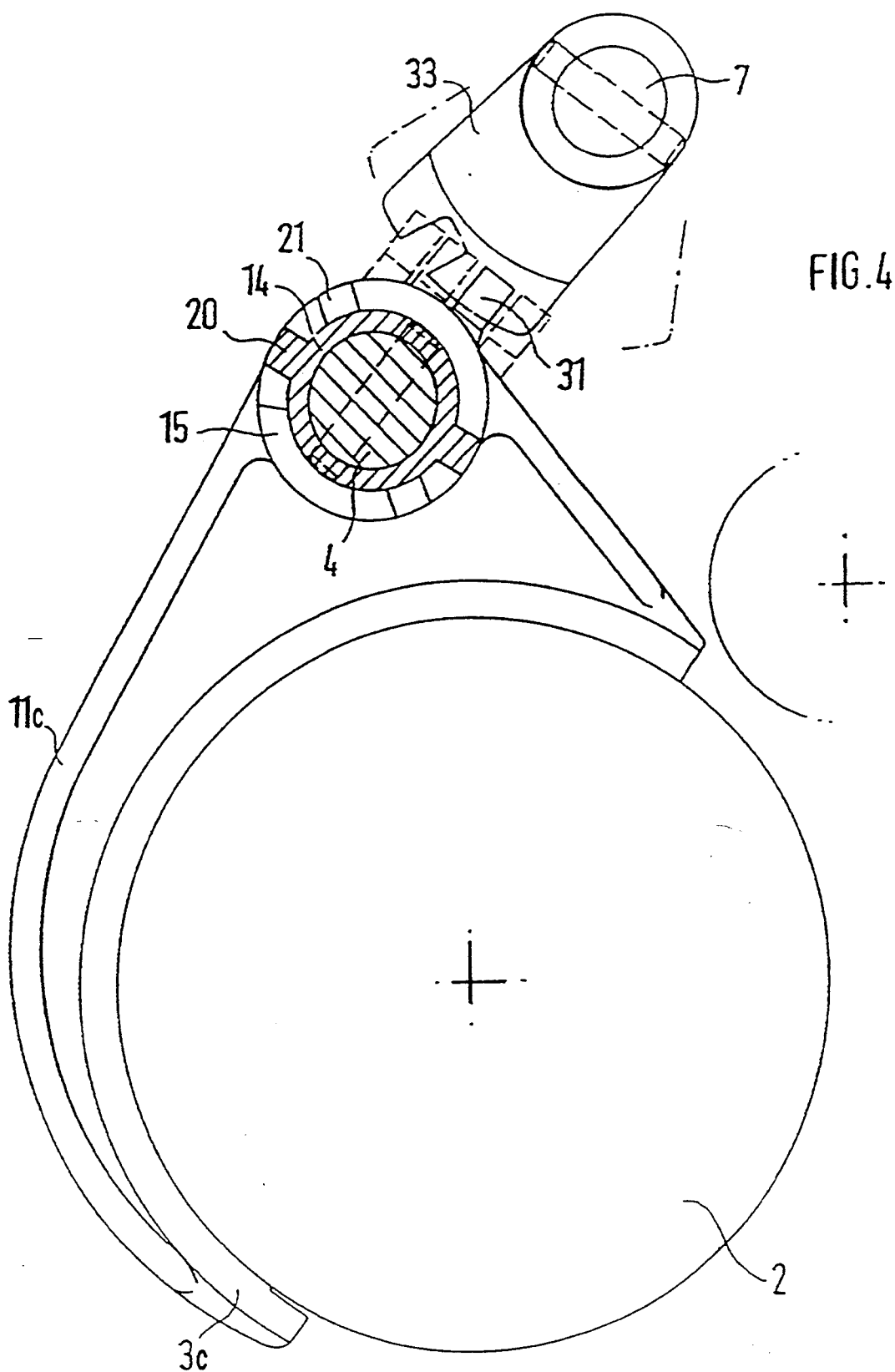
FIG. 4 is a partial cross-sectional view of the locking position of the transmission of FIG. 1 when the gears for G1/G1 are preselected.
Figure 5:
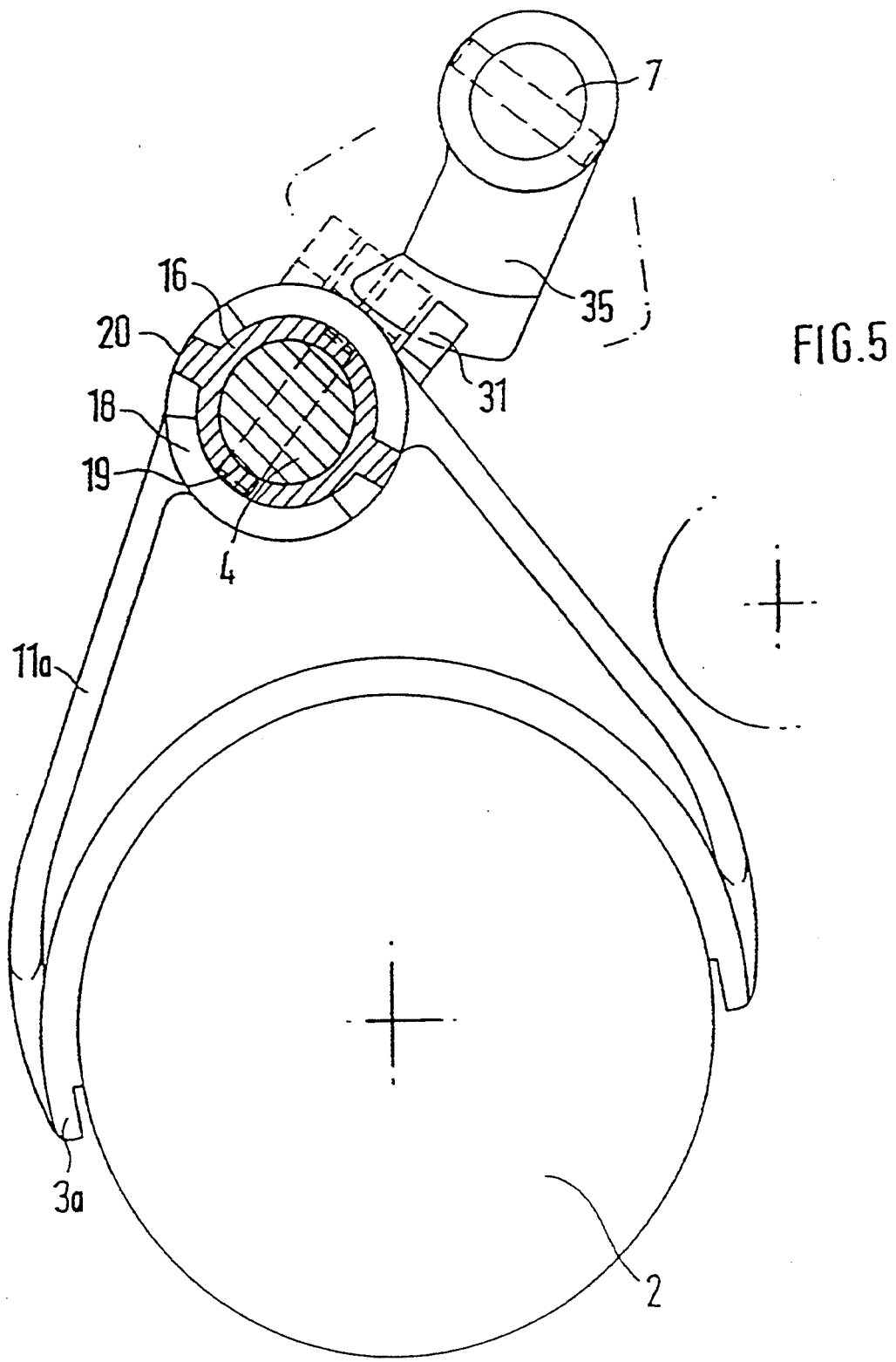
FIG. 5 is a partial cross-sectional view of the locking position of the transmission of FIG. 1 when the gears for the R-gear are preselected.

FIGS. 2 to 5 also show a position of the gear shift mechanism in which gears G3 and G4 are shiftable and all other gears are locked. In FIG. 2, the nose 31 of the shifting sleeve 12 is situated in front of a groove 36 of the locking part 3 which is continuous in the axial direction. When the gears G3, G4 are shifted, the nose 31 of the fork sleeve 13 can be guided through the groove 36 in a no-contact manner. As illustrated in FIG. 3 to 5, the noses 31 of the other fork sleeves 15, 17, 18 are held in contact on their locking parts 33, 34, 35. The locking during the shifting of another gear takes place in a similar manner. If, for example, the shifting channel G5/G6 is preselected, during the shifting of G5 or G6, the nose of the fork sleeve 17 moves laterally past the locking part 34 in a unhindered manner. The noses 31 of the other fork sleeves 13, 15, 18 rest against their locking parts.

Figure 6:
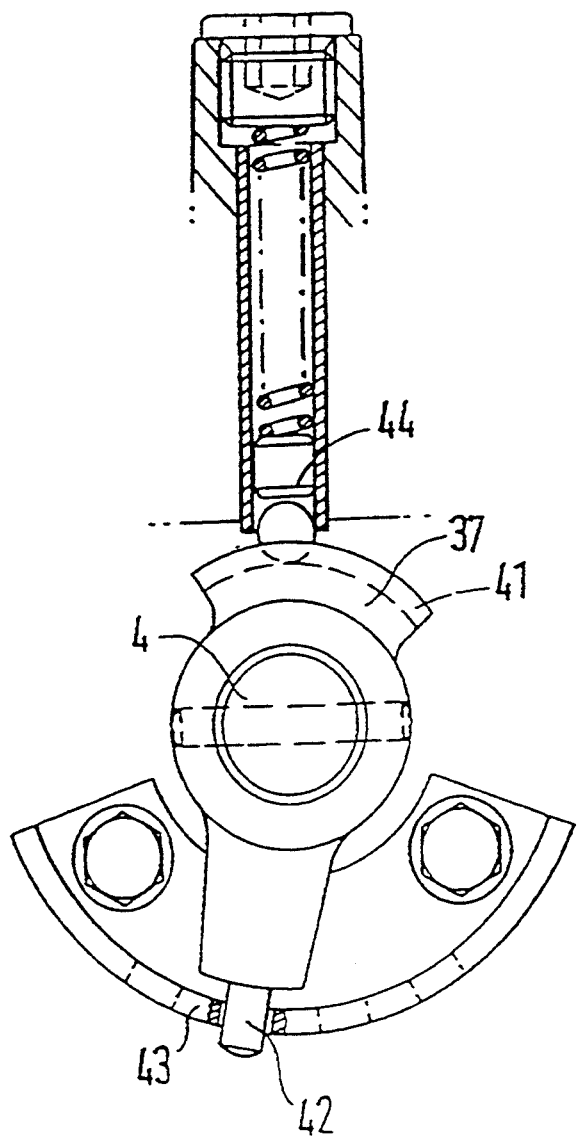
FIG. 6 is a cross-sectional view of a shifting shaft lock in accordance with the present invention.

A shift locking on the shifting shaft 4 has the effect that the respective engaged gear is held and can be changed only against a spring force. At the right end of the shifting shaft 4, a locking segment 37 is fastened, a spring lock 44 interacting with its three ring grooves. The numeral 38 generally designates a diagram of connections. In particular, the left ring groove 39 is used for holding the gears G5, G3, G1 and R; the right ring groove 40 is used as a gear shifting mechanism for G2, G4 and G6. The center ring groove 41 marks the neutral, unshifted zero position. As shown in FIG. 6, a locking pin 42, which extends along a connecting link lock 43 fixed to the case, is pressed in on the locking segment 37 diametrically opposite the center ring groove 41. In a top view, the connecting link lock 43 has the same configuration as the diagram of connections 38 and subjects the moving possibility of the shifting shaft 4 to narrow tolerances so that an extremely precise gear shifting can be implemented.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A shift mechanism of a motor vehicle transmission, said transmission having a plurality of transmission gears, the mechanism comprising a shifting shaft by rotation of which transmission gears can be preselected successively and by longitudinal displacement of which, the transmission gears can be shifted, and a locking shaft disposed parallel to the shifting shaft as as to be in rotation connection with the shifting shaft and arranged to be lockable in a longitudinal direction, wherein certain of the transmission gears which are not to be shifted are configured to be lockable by the locking shaft.

2. The shift mechanism according to claim 1, wherein a driving pin of the shifting shaft is longitudinally guided in a connecting rod guide of the locking shaft for the transmission of rotational movement.

3. The shift mechanism according to claim 1, further comprising shifting sleeves fastened on the shifting shaft, fork sleeves rotatably disposed on the shifting sleeves, shifting forks, which engage in synchronizer clutches of the transmission gears, mounted on the fork sleeves, and, for the shifting of the transmission gears, radially projecting claws of the shifting sleeves which rest against faces of the fork sleeves, the claws projecting in a no-contact manner into ring recesses of only the fork sleeves that are not to be operated.

4. The shift mechanism according to claim 1, having fork sleeves that are arranged to be locked against longitudinal movement by locking parts fastened on the locking shaft and rotatable together therewith corresponding to a preselected position.

5. The shift mechanism according to claim 4, wherein radially projecting noses are mounted on the fork sleeves, the nose of the fork sleeve to be actuated projecting into an axially continuous groove of its associated locking part, the noses of the other fork sleeves that are not to be actuated resting against their locking parts.

6. The shift mechanism according to claim 2, wherein the connecting rod guide is mounted on a leg of an angular bracket fastened on the locking shaft, and another leg of the angular bracket, functioning as a preselection lock, has a ramp profile against which a spring pin rests.

7. The shift mechanism according to claim 6, wherein the preselection of gears is deterred by a portion of the ramp profile configured as a flat ramp, and preselection of a reverse gear of said transmission gears is deterred by a portion of the ramp profile configured as a steel ramp.

8. The shift mechanism according to claim 1, wherein the longitudinal movement of the shifting shaft can be locked in three positions by a spring lock and the shifting movement of the shifting shaft has narrow tolerances as a result of a stationary connecting rod lock, wherein the is shaped according rod lock corresponding to a diagram of connections of the shifting mechanism.

* * * * *